G. Neilson,
Car Ventilator.
No. 649. Reissued Jan. 18, 1859.
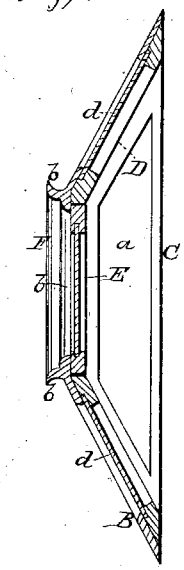
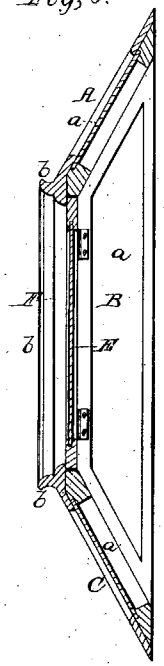
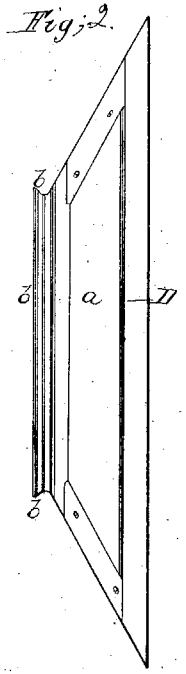
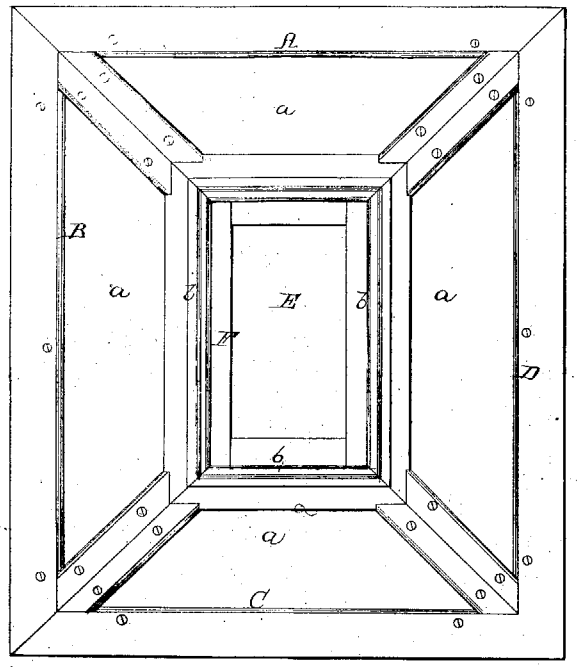
Witnesses,
R. H. Eddy
F. P. Hale jr.
Inventor,
George Nilson
W. PETERS, PHOTO-LITHOGRAPHER, WASHINGTON, D. C.

UNITED STATES PATENT OFFICE.

GEORGE NEILSON, OF BOSTON, MASSACHUSETTS.

IMPROVEMENT IN VENTILATING-WINDOWS FOR RAILROAD-CARS.

Specification forming part of Letters Patent No. 10,990, dated May 30, 1854; Reissue No. 649, dated January 18, 1859.

*To all whom it may concern:*

Be it known that I, GEORGE NEILSON, of Boston, in the county of Suffolk and State of Massachusetts, have invented a new and useful Ventilator-Window for Railway-Cars; and I do hereby declare that the same is fully described and represented in the following specification and the accompanying drawings, letters, figures, and references thereof.

Of the said drawings, Figure 1 denotes a front view, Fig. 2 a side view, Fig. 3 a vertical and central section, and Fig. 4 a horizontal and central section, of a railway-car ventilator-window constructed in my improved manner.

I make a window-frame which shall be in shape of a frustum of a quadrangular pyramid, the frame being composed of four trapezoidal frames, A B C D, in each of which a frame of glass, *a*, is inserted. The inferior base of the window is made open, as seen at F, and has a closing window, E, applied to it by means of hinges and so as to open inward. The said window-opening is surrounded on its four sides and at the terminations of the lesser bases of the trapezoidal surfaces with a deflecting flange or rim, *b*, which is curved horizontally, as seen in Figs. 3 and 4, the object of the deflector being not only to prevent rain and dust from passing or being blown into the window-opening, but it is to deflect aerial currents against the main current or body of air that may impinge on any one of the external inclined surfaces of the ventilator-window. By such deflection the currents are made to pass across the window-openings at a greater distance from it than they would were no deflector used. By passing by it at such greater distance the liability of dust to enter the window is greatly diminished.

The ventilator-window so constructed is made to project outward from the side of a railway-carriage or an opening in the said side, and as the carriage moves on the railway-track the ventilating-window (provided its window E is opened) will not only serve to ventilate the car or induce outward currents or cause the air in the car to rush out of it, but it at the same time enables a person not only to see objects laterally of the track, but those which are in or nearly in line with the track. A window so made, instead of having its four trapezoidal sides or portions connected together, may have them made separate from each other and hinged to the car, so that they, or any one of them, may be opened, if desirable. I do not, however, deem such a mode of constructing it so advantageous as that exhibited in the drawings.

Instead of making the ventilating projecting window with four converging sides, A B C D, it may be otherwise constructed of any other suitable number or in any other proper manner so long as the principle of invention be retained—namely the deflection of air across a smaller window placed in and forming part of the main window projecting from the side of the car and having the deflector between it and the car.

I am aware that for the purpose of ventilating railroad carriages, inclined or hinged flaps have been used on the sides of the window or window-openings thereof. I am also aware that a curved guard has been made to extend down one side and over the top and under the bottom of a window thereof. I am also aware that a window has been made in two sashes, each hinged to one side of the window, so that one may be made to stand inclined to the plane of the other and to have an opening between them. I do not claim any such means of ventilating.

I am also aware that pyramidal windows have been used on the tops of buildings.

I am not aware that a ventilator-window to be applied to a railway-carriage has ever been constructed of a convergent form and provided with a window-opening, and a closing window or door composed in part or entirely of glass or other suitable transparent material. Nor am I aware that a ventilator-window so made has had a deflecting rim or flange applied entirely around its opening and for the purpose of shedding rain and deflecting currents of air from the inclined surfaces of the window.

I therefore claim—

1. The convergent ventilating-window as made with deflecting and light-penetrating sides or surfaces and an air-opening, F, and a closing window or cover, E, essentially as above explained, and to be applied to the opening of a side of a railway-car, substantially as specified.

2. The arrangement of the deflector guard entirely around the window-opening and in respect to the deflecting-sides A B C D, as specified, not intending to claim a deflector or guard as applied to a car-window opening, but to claim its arrangement on four deflecting sides or planes and entirely around the opening between them, as set forth.

In testimony whereof I have hereunto set my signature this 2d day of August, A. D. 1858.

GEORGE NEILSON.

Witnesses:

R. H. EDDY,

F. P. HALE, Jr.